United States Patent
Caverni et al.

(10) Patent No.: US 10,433,364 B2
(45) Date of Patent: Oct. 1, 2019

(54) SYSTEMS AND METHODS FOR FACILITATING THE TRANSITION OF A WIRELESS COMMUNICATION DEVICE (WCD) FROM A CELL_FACH STATE TO A CELL_DCH STATE

(71) Applicant: TELEFONAKTIEBOLAGET LM ERICSSON (PUBL), Stockholm (SE)

(72) Inventors: Alessandro Caverni, Stockholm (SE); Jose Luis Pradas, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 177 days.

(21) Appl. No.: 15/549,706

(22) PCT Filed: Feb. 10, 2015

(86) PCT No.: PCT/SE2015/050159
§ 371 (c)(1),
(2) Date: Aug. 9, 2017

(87) PCT Pub. No.: WO2016/130057
PCT Pub. Date: Aug. 18, 2016

(65) Prior Publication Data
US 2018/0027607 A1 Jan. 25, 2018

(51) Int. Cl.
*H04W 76/27* (2018.01)
*H04W 52/38* (2009.01)
(Continued)

(52) U.S. Cl.
CPC .......... *H04W 76/27* (2018.02); *H04L 1/1812* (2013.01); *H04L 1/1887* (2013.01); *H04W 52/38* (2013.01); *H04W 72/1278* (2013.01)

(58) Field of Classification Search
CPC ..... H04W 76/27; H04W 52/38; H04W 72/00; H04W 72/1278; H04L 1/1812; H04L 1/1887

See application file for complete search history.

(56) References Cited

U.S. PATENT DOCUMENTS

| 2008/0045255 | A1* | 2/2008 | Revel .................. H04L 1/1812 455/510 |
| 2009/0181710 | A1 | 7/2009 | Pani et al. |

(Continued)

FOREIGN PATENT DOCUMENTS

EP 2696636 A1 2/2014

OTHER PUBLICATIONS

International Search Report and Written Opinion issued in Application No. PCT/SE2015/050159 dated Oct. 12, 2015, 10 pages.
(Continued)

*Primary Examiner* — Margaret G Mastrodonato
(74) *Attorney, Agent, or Firm* — Sage Patent Group

(57) ABSTRACT

In one aspect, a method for facilitating the transition of a wireless communication device, WCD, (102) from a CELL_FACH state to a CELL_DCH state is provided. In some embodiments, the method includes determining that the WCD (102) should transition from the CELL_FACH to the CELL_DCH cell state. The method further includes, in response to determining that the WCD should transition from the CELL_FACH to the CELL_DCH cell state, i) sending to the WCD (102) a first configuration message (302) for moving the WCD from the CELL_FACH state to the CELL_DCH state and ii) sending to the WCD a second configuration message (304) for forcing the WCD to obtain a common E-DCH resource or retain a previously obtained common E-DCH resource.

26 Claims, 9 Drawing Sheets

(51) Int. Cl.
*H04L 1/18* (2006.01)
*H04W 72/12* (2009.01)

(56) References Cited

U.S. PATENT DOCUMENTS

2011/0164560 A1* 7/2011 Ki .................... H04L 1/1874
370/328
2013/0083756 A1 4/2013 Pradas et al.

OTHER PUBLICATIONS

3rd Generation Partnership Project; Technical Specification Group Radio Access Network; Medium Access Control (MAC) protocol specification (Release 11), 3GPP TS 25.321 V11.5.0, 2013, 207 pages.
3rd Generation Partnership Project; Technical Specification Group Radio Access Network; Radio Link Control (RLC) protocol specification (Release 11), 3GPP TS 25.322 V11.2.0, 2013, 90 pages.
3rd Generation Partnership Project; Technical Specification Group Radio Access Network; Radio Resource Control (RRC); Protocol specification (Release 11), 3GPP TS 25.331 V11.11.0, 2014, 2101 pages.

* cited by examiner

SYSTEMS AND METHODS FOR FACILITATING THE TRANSITION OF A WIRELESS COMMUNICATION DEVICE (WCD) FROM A CELL_FACH STATE TO A CELL_DCH STATE

CROSS REFERENCE TO RELATED APPLICATION(S)

This application is a 35 U.S.C. § 371 National Stage of International Patent Application No. PCT/SE2015/050159, filed Feb. 10, 2015, designating the United States, which is incorporated by reference.

TECHNICAL FIELD

This disclosure relates to facilitating the transition of a wireless communication device (WCD) from a CELL_FACH state to a CELL_DCH state.

BACKGROUND $3^{rd}$ Generation Partnership Project (3GPP) networks, beginning in Release 9, support the use of enhanced-uplink dedicated channels (E-DCH) in the forward access channel (CELL_FACH) cell state and Idle Mode, in addition to the dedicated channel (CELL_DCH) cell state. Previously, wireless communication devices (WCDs) had to use a random-access channel (RACH) while in the CELL_FACH cell state or in Idle Mode.

When a WCD in the CELL_FACH state has data to transmit in the uplink (UL), the WCD may request a common E-DCH resource from the network. The network allocates a common E-DCH resource to the WCD. Then, the WCD can use the allocated common E-DCH resource to transmit its UL data. In some configurations, when the WCD has finished transmitting all of its UL data (i.e., when the WCD has emptied its transmit buffer), the WCD waits a certain amount of time (i.e., the E-DCH transmission continuation back-off timer) and then sends a Media Access Control (MAC) protocol data unit (PDU) containing scheduling information (SI) with the Total E-DCH Buffer Status (TEBS) set to zero. In response to receiving a Layer 1 ACK sent in response to the MAC-PDU containing the SI, the WCD releases the common E-DCH resource that the network had allocated to the WCD.

When a WCD is commanded to transition from the CELL_FACH state to the CELL_DCH state (e.g., the WCD receives a Radio Bearer (RB) Reconfiguration message) and the WCD does not have a common E-DCH resource, then the WCD must synchronize with the network. This synchronization may take several hundreds of milliseconds, during which time data may not be transmitted. If the WCD instead has a common E-DCH resource, according to 3GPP TS 25.331, after receiving an RB Reconfiguration message instructing the WCD to transition to CELL_DCH cell state, the WCD has at most 100 ms to apply the new configuration and must inform the network within 110 ms. That is because if the WCD has a common E-DCH resource during reconfiguration to the CELL_DCH state, the WCD may not need to synchronize with the network and seamless transition may be possible. That is, the reconfiguration procedure from CELL_FACH state to CELL_DCH will be speeded up if the WCD has a common E-DCH resource during the reconfiguration.

One way to ensure that the WCD has a common E-DCH resource when a reconfiguration occurs involves transmitting a concrete HS-SCCH order from the network to the WCD, a feature introduced in 3GPP Release 11, called NodeB triggered HS-DPCCH transmission. The problem with this method is that it depends on WCDs implementing the 3GPP Release 11 standard, and so would not work with legacy WCDs implementing 3GPP Release 8, 9, or 10.

Another method relies on sending Radio Link Control (RLC) Acknowledged Mode (AM) data in the downlink, with the polling information set, so as to trigger an RLC Acknowledgment in the uplink. But in this method, the Acknowledgement may be delayed by the parameter Timer_Status_Prohibit (3GPP 25.322 TS), which controls how much time has to elapse between two consecutive Acknowledgements. Additionally, the method does not prevent the WCD from releasing the E-DCH resource before reconfiguration finishes. Further, there is a risk in this method of the WCD missing the RLC AM downlink data, which would trigger retransmission of the RLC AM downlink data, degrading the overall network performance and possibly causing a mismatch between the protocol variables in the transmitter and receiver. This method also affects RLC protocol variables.

Another method relies on increasing the duration of the E-DCH transmission continuation back-off timer. Increasing the duration of this timer, however, may not be a viable solution since the timer is broadcast and used by all the WCDs that have acquired a common E-DCH resource for DCCH/DTCH transmission. Moreover, a large value of the timer would result in decreased network capacity and increased UL interference (the WCD keeps on transmitting the UL DPCCH until the resources are released).

Accordingly, there is a need for a method to ensure seamless transition from CELL_FACH to CELL_DCH cell state in a wireless communication device, in a reliable and robust way, that does not interfere with RLC protocol variables and is backwards-compatible with legacy WCDs.

SUMMARY

This disclosure relates to systems and methods for facilitating the transition of a wireless communication device (WCD) from a CELL_FACH state to a CELL_DCH state. In one aspect, a method is performed by a radio access node (e.g., a radio network controller (RNC) or a Node B). The method includes the steps of determining that the WCD should transition from the CELL_FACH to the CELL_DCH state. The method further includes, in response to determining that the WCD should transition from the CELL_FACH to the CELL_DCH cell state, sending to the WCD a first configuration message for moving the WCD from the CELL_FACH state to the CELL_DCH state. The method further includes, in response to determining that the WCD should transition from the CELL_FACH to the CELL_DCH cell state, sending to the WCD a second configuration message for forcing the WCD to obtain a common E-DCH resource or retain a previously obtained common E-DCH resource.

In some embodiments, the method further includes determining that the WCD i) has not yet transitioned to the CELL_DCH state and ii) has transmitted an acknowledgement in response to the second configuration message. The method further includes sending to the WCD a third configuration message for forcing the WCD to retain a previously obtained common E-DCH resource in response to determining that the WCD i) has not yet transitioned to the CELL_DCH state and ii) has transmitted the acknowledgement.

In some embodiments, the method further includes determining that the WCD has not yet transitioned to the CELL_DCH state. The method further includes sending to the WCD a third configuration message for forcing the WCD to retain a previously obtained common E-DCH resource in response to determining that the WCD has not yet transitioned to the CELL_DCH state.

In some embodiments, the second configuration message is a message for requesting the WCD to move a reception window and the third configuration message is the same as the second configuration message. In some embodiments, the second configuration message comprises a Move Receiving Window (MRW) super-field (SUFI). In such embodiments, the second configuration message may contain outdated information about the reception window.

In some embodiments, the first configuration message is one of a Cell Update Confirm message, a Radio Bearer (RB) Reconfiguration message, and an RB Setup message.

In some embodiments, the method further includes receiving a Media Access Control (MAC) protocol data unit (PDU) transmitted by the WCD in response to the second configuration message. The method further includes, in response to receiving the MAC PDU transmitted by the WCD, transmitting to the WCD a hybrid repeat request (HARQ) negative acknowledgment (NACK) regardless of whether the MAC PDU was successfully decoded.

In another aspect, a method is performed by an access node (e.g., a radio network controller (RNC) or a Node B) of a radio access network. The method includes the steps of determining that the WCD should transition from the CELL_FACH to the CELL_DCH state. The method further includes, in response to determining that the WCD should transition from the CELL_FACH to the CELL_DCH state, sending to the WCD a configuration message for moving the WCD from the CELL_FACH state to the CELL_DCH state. The method further includes, after sending the configuration message, receiving a status message transmitted by the WCD. The method further includes, after receiving the status message, causing the WCD to resend the status message.

In some embodiments, the configuration message is one of a Cell Update Confirm message, a Radio Bearer (RB) Reconfiguration message, and an RB Setup message. In some embodiments, the status message is a media access control (MAC) protocol data unit (PDU) comprising Scheduling Information with a Total E-DCH Buffer Status set to zero.

In some embodiments, causing the WCD to resend the status message comprises sending to the WCD a response message for causing the WCD to resend the status message. In some embodiments, the response message is a MAC hybrid automatic repeat request (HARQ) negative acknowledgement (NACK). In some embodiments, causing the WCD to resend the status message comprises not sending any acknowledgement message responding to the status message, thereby causing the WCD to resend the status message.

In some embodiments, the method further includes receiving a second status message transmitted by the WCD. The method further includes determining whether the WCD has transitioned to the CELL_DCH state. The method further includes, in response to determining that the WCD has not transitioned to the CELL_DCH state, sending, as a response to the second status message, a response message for causing the WCD to resend the second status message.

The above and other aspects and embodiments are described below.

DETAILED DESCRIPTION

Disclosed herein are systems and methods for facilitating the transition of a wireless communication device (WCD) from a CELL_FACH state to a CELL_DCH state. A significant advantage of the disclosed systems and methods is that they may provide a robust way to seamlessly transition a WCD from a CELL_FACH state to a CELL_DCH state, e.g., data flow may continue with a minimum disruption during the transition. Additionally, the disclosed techniques will function on all WCDs that support common E-DCH resources in CELL_FACH state. Additionally, the disclosed techniques will not degrade the network capacity in terms of resources or uplink interference. Additionally, the disclosed techniques have no side effects on the RLC protocol. By using the techniques disclosed herein, a WCD may transition from a CELL_FACH state to a CELL_DCH state, with minimal disruption.

Figure 1:
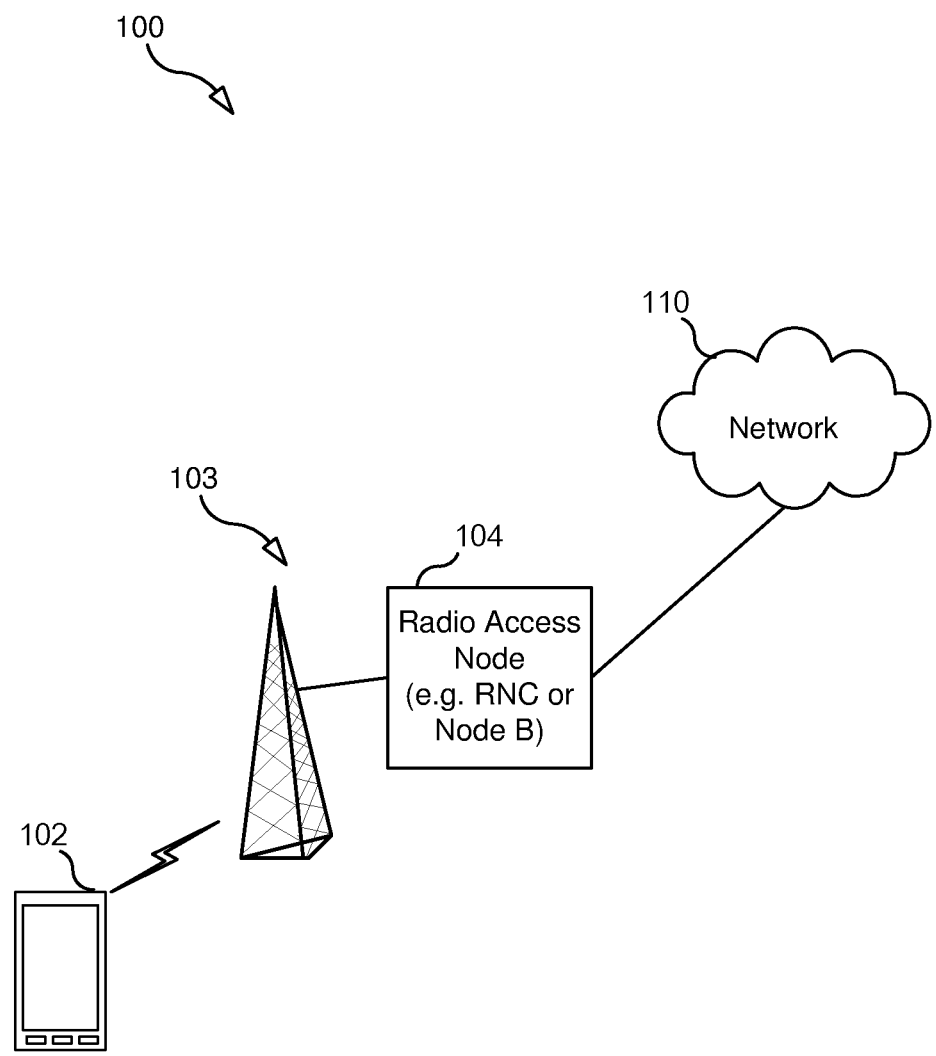
FIG. 1 is a diagram of a wireless communication system, according to some embodiments.

FIG. 1 is a block diagram of a wireless communication system 100, according to some embodiments. The wireless communication system 100 includes a WCD 102 (e.g., a smartphone, a tablet, a phablet, or any other wireless communication device), a radio access network (RAN) 103, which comprises at least one antenna and at least one access node (AN) 104, and a core network 110. In some embodiments, the AN 104 comprises one or more of a Radio Network Controller (RNC) and a Node B. Core network 110 includes well known core network nodes (not shown), such as a mobility management node (e.g., an SGSN) and a gateway (e.g., GGSN).

Figure 2:
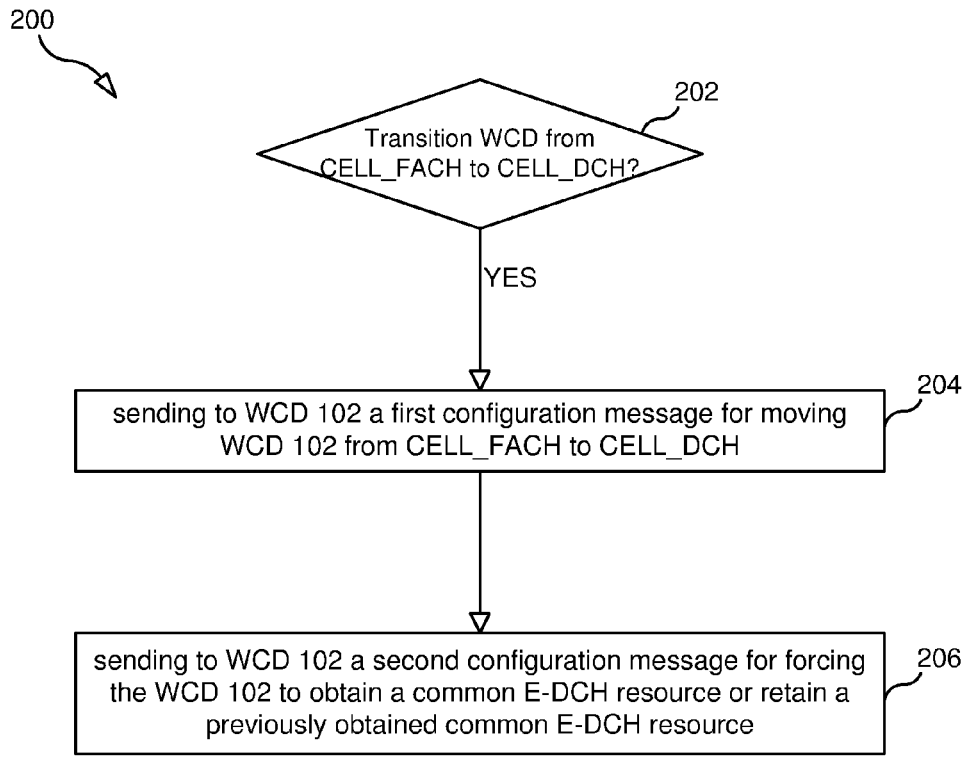
FIG. 2 is a flow chart of a method for facilitating the transition of a WCD from a CELL_FACH state to a CELL_DCH state, according to some embodiments.

FIG. 2 is a flow chart of illustrating a process 200 for facilitating the transition of a WCD from a CELL_FACH state to a CELL_DCH state, according to some embodiments. In some embodiments, AN 104 performs process 200.

In step 202, it is determined that WCD 102 should transition from the CELL_FACH to the CELL_DCH cell state. In response to determining that WCD 102 should transition from the CELL_FACH to the CELL_DCH cell state, steps 204 and 206 are performed. In some embodiments, step 204 is performed before step 206 while in other embodiments, step 204 occurs after step 206.

Figure 3:
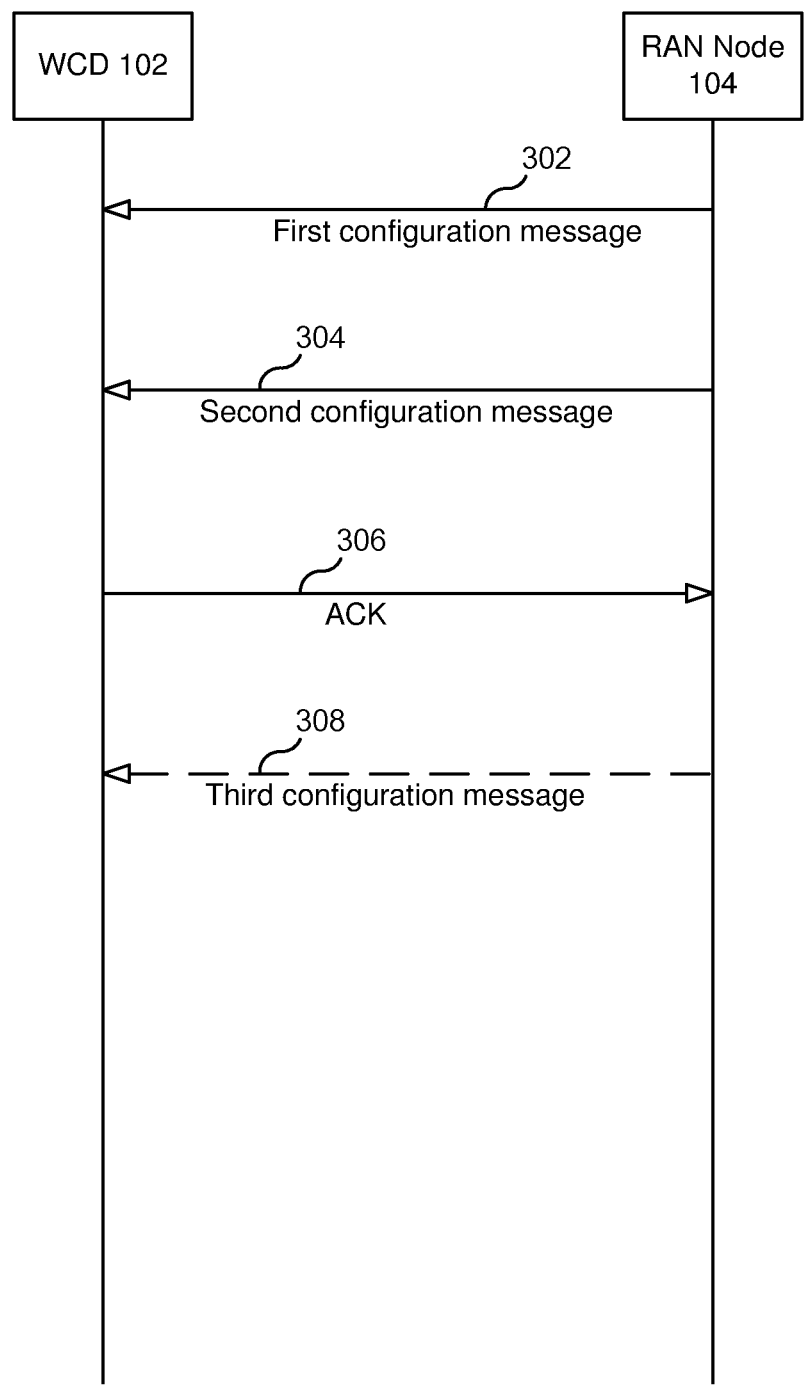
FIG. 3 is a message flow diagram, according to some embodiments.

Step 204 includes sending to WCD 102 a first configuration message 302 (see FIG. 3) for moving WCD 102 from the CELL_FACH state to the CELL_DCH state. In some embodiments, the first configuration message 302 is one of: i) a Cell Update Confirm message, which is sent as a response to a cell update transmitted by the WCD, ii) a Radio Bearer (RB) Reconfiguration message, and iii) an RB Setup message.

Step 206 includes sending to WCD 102 a second configuration message 304 for forcing WCD 102 to obtain a common E-DCH resource or retain a previously obtained common E-DCH resource. In response to message 304, WCD may transmit an acknowledgment (ACK) 306. In some embodiments the second configuration message 304 is a message for requesting the WCD to move a reception window, such as, for example, a Status PDU containing a Move Receiving Window (MRW) super-field (SUFI). In such an embodiments, ACK 306 is a PDU containing an MRW_ACK_SUFI. In some embodiments, the second configuration message 304 contains outdated information about the reception window.

The MRW SUFI is part of a Status PDU used to request the receiver to move its reception window. The MRW SUFI is defined in 3GPP Technical Specification (TS) 25.322 v11.2.0. Unlike some other Status PDUs, MRW SUFI and MRW_ACK_SUFI are not restricted by the parameter Timer_Status_Prohibit. Further, if the MRW SUFI contains outdated information about the reception window, WCD 102 will not take any action apart from acknowledging the reception of the MRW SUFI. That is, the MRW SUFI with outdated information is essentially a dummy PDU whose effect is just to trigger an acknowledgement and will not affect any of the protocol variables. This allows the network to force the WCD to acquire a common E-DCH resource without impacting the ongoing RLC procedures and variables.

Figure 4:
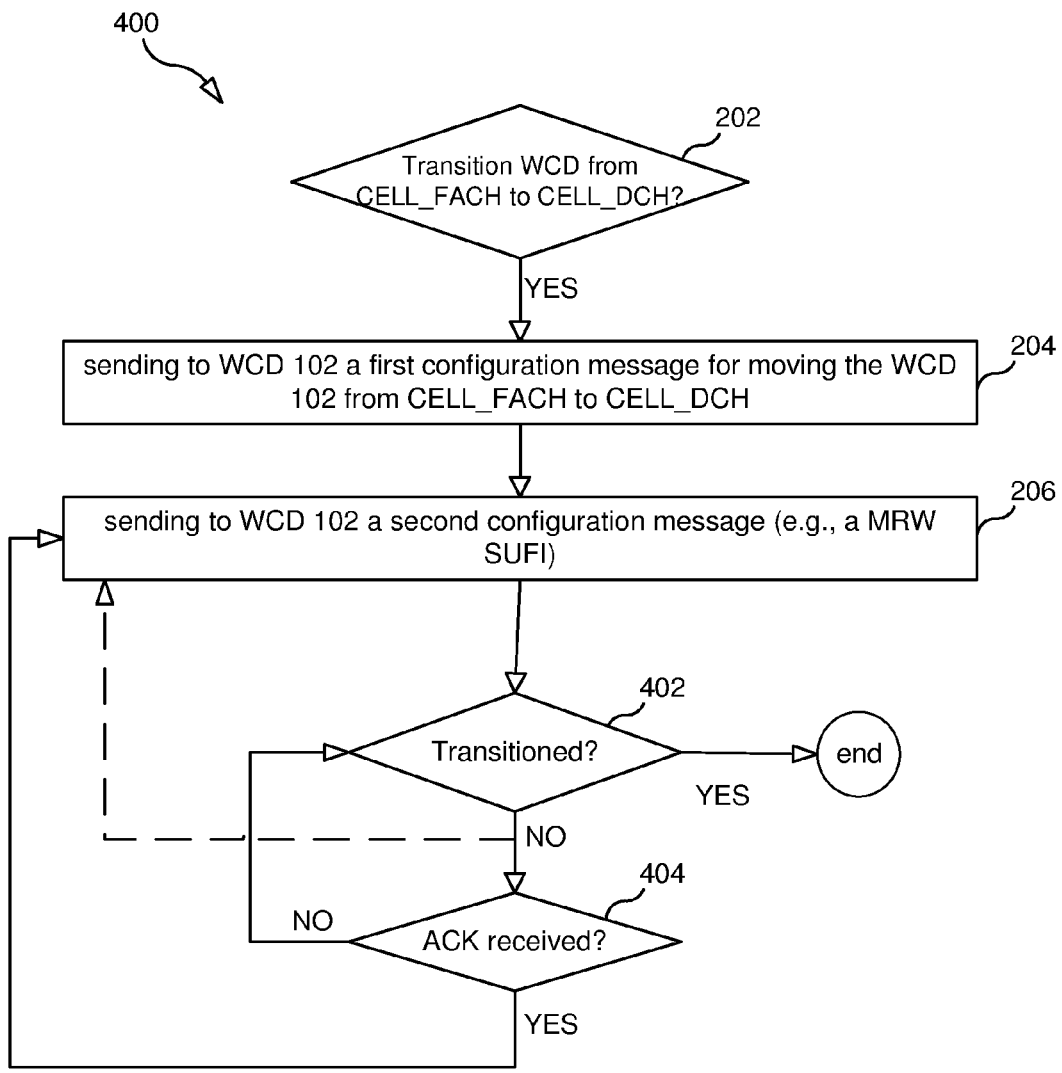
FIG. 4 is a flow chart of a method for facilitating the transition of a WCD from a CELL_FACH state to a CELL_DCH state, according to some embodiments.

FIG. 4 is a flow chart illustrating a process 400 for facilitating the transition of a WCD from a CELL_FACH state to a CELL_DCH state, according to some embodiments. Like method 200, method 400 includes steps 202-206 (see FIG. 2).

Referring to FIG. 4, after step 206, AN 104 determines whether WCD 102 has transitioned to the CELL_DCH state (step 402). In some embodiments, a determination that the WCD has transitioned to CELL_DCH state may be made, for example, by receiving a message from the WCD indicating a successful transition, such as an RB Reconfiguration Complete message. The determination may also be made based on data that the WCD transmits before sending such a message, for example, because the message is received on the new configuration.

If AN 104 determines that WCD 102 has transitioned to the CELL_DCH state, then the process may end, otherwise, in some embodiments, process 400 proceeds to step 404 (in other embodiments, however, rather than proceeding to step 404, the process 400 simply goes back to step 206).

In step 404, AN 104 determines whether it has received ACK 306 transmitted by WCD 102 in response to second configuration message 304. For example, when message 304 is an MRW SUFI, WCD 102 responds to the MRW SUFI by sending an MRW_ACK_SUFI. Thus, in some embodiments, in step 404, AN 104 determines whether it has received an MRW_ACK SUFI transmitted by WCD 102 in response to the MRW SUFI.

If ACK 306 has not been received, process 400 goes back to step 402, otherwise if ACK 306 has been received, process 400 goes back to step 206, where once again AN 104 transmits to WCD 104 the second configuration message 304 (e.g., AN 104 transmits to WCD 102 another PDU comprising an MRW SUFI). Preferably, the amount of time between AN 104 receiving the ACK and AN 104 once again transmitting configuration message 304 is less than the amount of time WCD waits after emptying its transmit buffer to send the PDU containing SI with TEBS set to zero (i.e., the E-DCH transmission continuation back-off timer).

Figure 5:
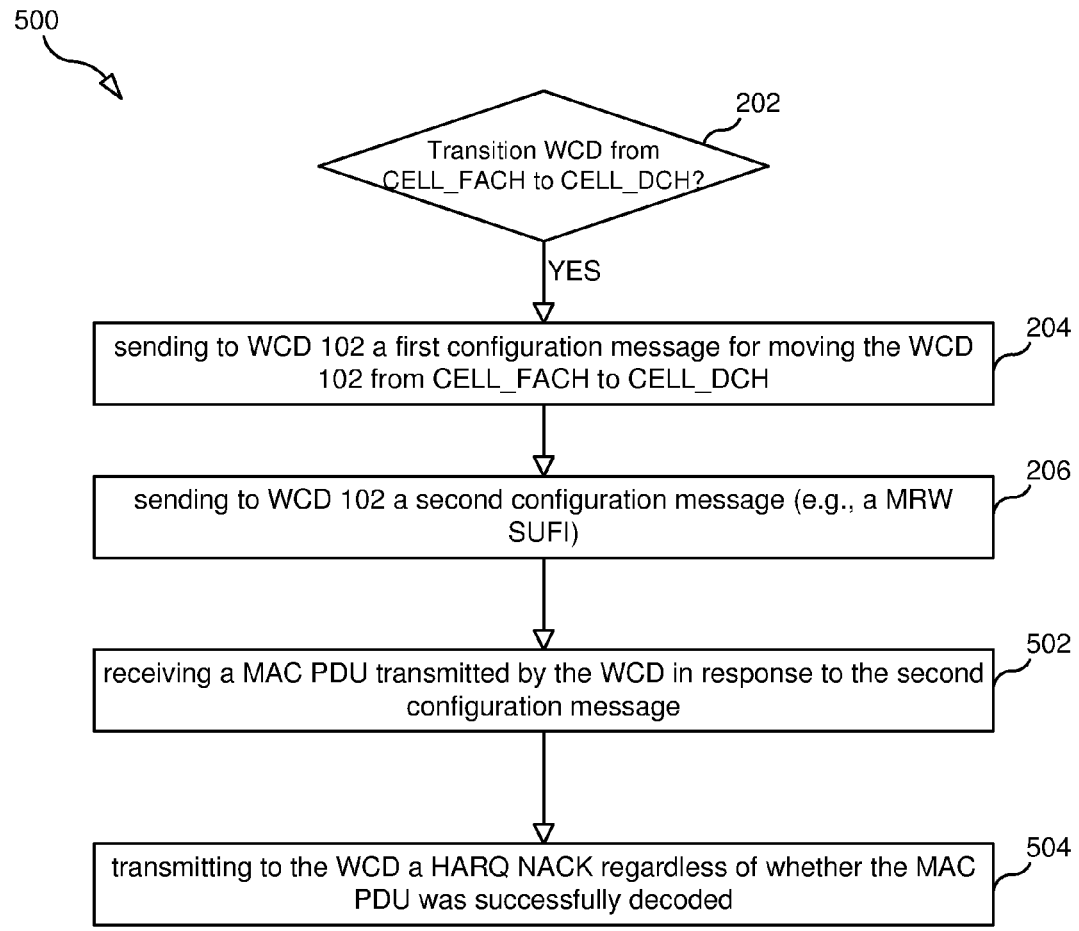
FIG. 5 is a flow chart of a method for facilitating the transition of a WCD from a CELL_FACH state to a CELL_DCH state, according to some embodiments.

FIG. 5 is a flow chart illustrating a process 500 for facilitating the transition of a WCD from a CELL_FACH state to a CELL_DCH state, according to some embodiments. Like method 200, method 500 includes steps 202-206 (see FIG. 2). Referring to FIG. 5, after step 206, AN 104 receives a MAC PDU transmitted by the WCD in response to second configuration message 304 (step 502). For example, as explained above, configuration message 304 may comprise an MRW SUFI and, in response to message 304, WCD 102 transmits ACK 306. In some embodiments, WCD 102 transmits ACK 306 by transmitting at least one MAC PDU that includes at least a portion of ACK 306.

In step 504, AN 104, in response to receiving the MAC PDU transmitted by WCD 102, transmits to WCD 102 a hybrid repeat request (HARQ) negative acknowledgement (NACK) regardless of whether the MAC PDU was successfully decoded. This will force WCD 102 to resend the MAC PDU. In some embodiments, step 504 may be performed until the WCD successfully transitions to the CELL_DCH state. That is, for example, in some embodiments, AN 104 in response to receiving the MAC PDU first determines whether WCD 102 has transitioned to CELL_DCH. If not, then AN 104 transmit the HARQ NACK, otherwise AN 104 transmits a HARQ ACK.

Figure 6:
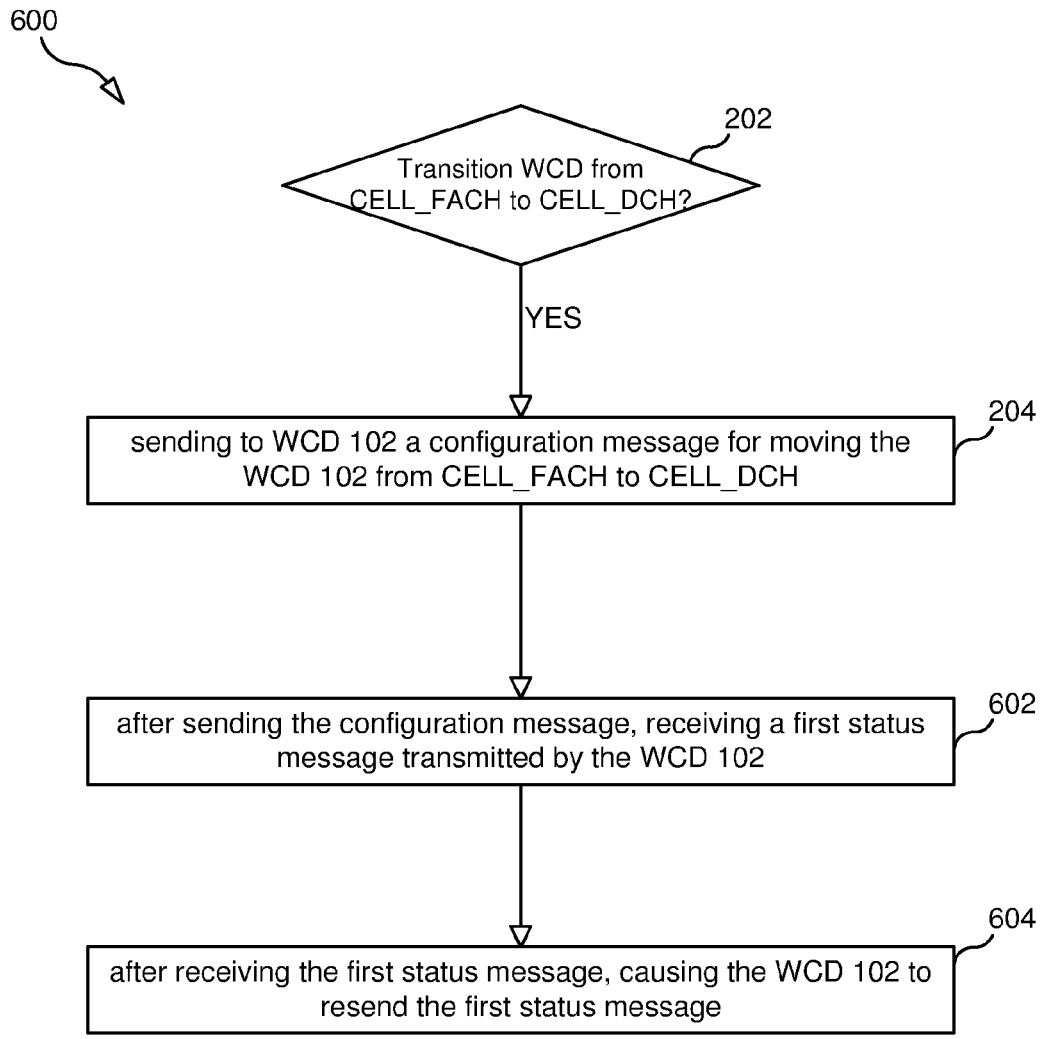
FIG. 6 is a flow chart of a method for facilitating the transition of a WCD from a CELL_FACH state to a CELL_DCH state, according to some embodiments.
Figure 7:
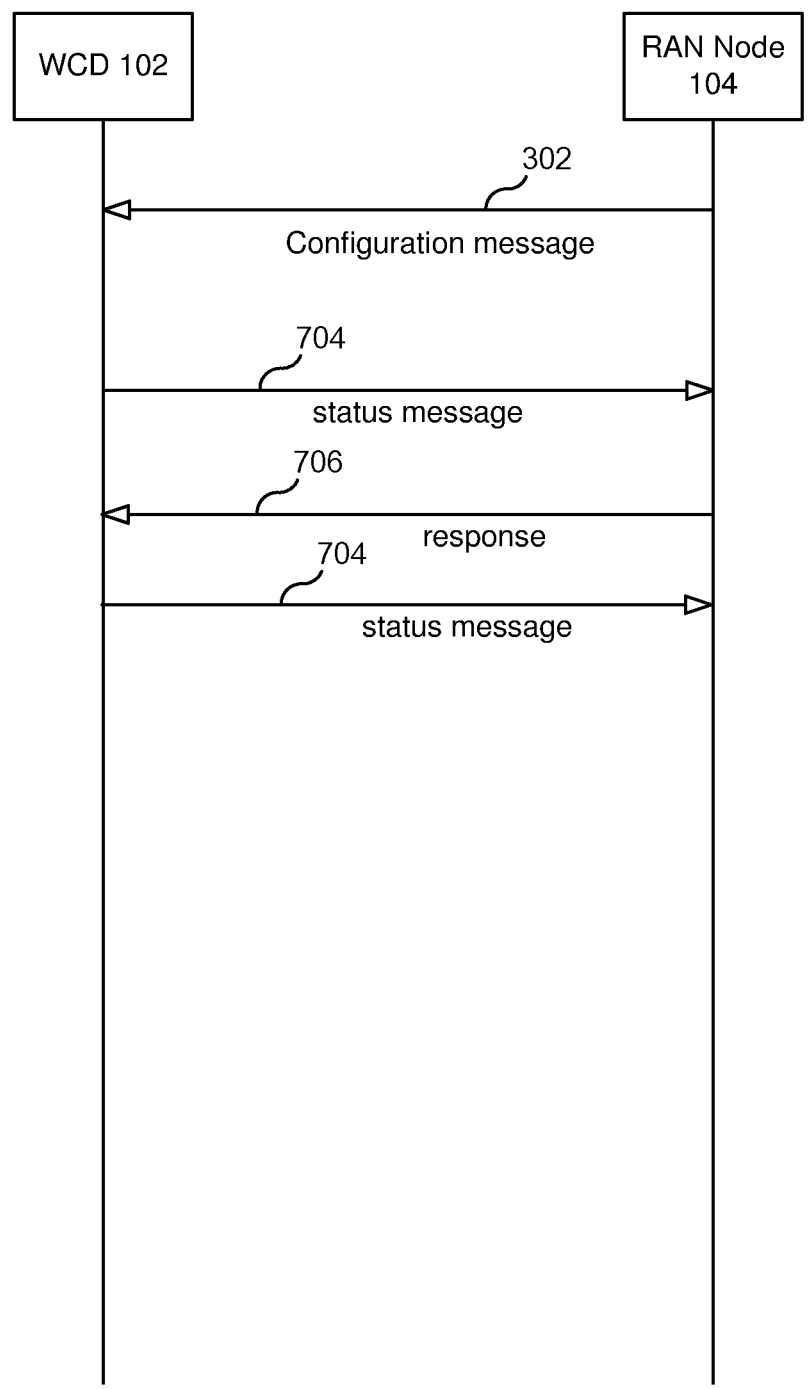
FIG. 7 is a message flow diagram, according to some embodiments.

FIG. 6 is a flow chart illustrating a process 600 for facilitating the transition of a WCD from a CELL_FACH state to a CELL_DCH state, according to some embodiments. Like method 200, method 600 includes steps 202-204 (see FIG. 2). Referring to FIG. 6, after AN 104 sends the configuration message 302, AN 104 receives a status message 704 (see FIG. 7) transmitted by WCD 102. In some embodiments, status message 704 is a MAC PDU comprising Scheduling Information with a Total E-DCH Buffer Status (TEBS) set to zero.

In step 604, AN 104 causes WCD 102 to resend status message 704. In some embodiments, causing WCD 102 to resend status message 704 comprises sending to WCD 102 a response message 706 for causing the WCD to resend status message 704. In some embodiments, response message 706 is a HARQ NACK. The HARQ NACK is sent regardless of whether AN 104 has decoded message 704 successfully. In other embodiments, causing WCD 102 to resend status message 704 comprises not sending any acknowledgement message responding status message 704, thereby causing the WCD to resend status message 704.

Figure 8:
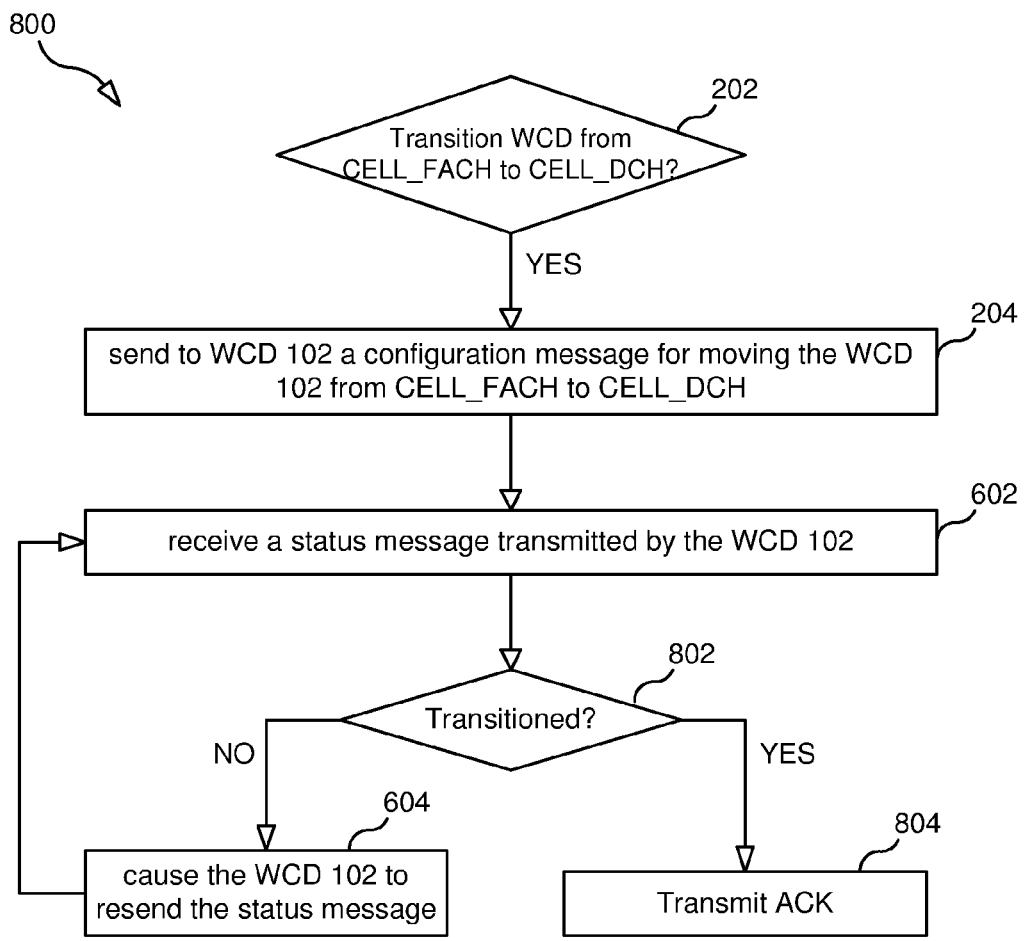
FIG. 8 is a flow chart of a method for facilitating the transition of a WCD from a CELL_FACH state to a CELL_DCH state, according to some embodiments.

In some embodiments, step 604 may be performed until the WCD successfully transitions to the CELL_DCH state. That is, for example, in some embodiments, in response to receiving status message 704, AN 104 first determines whether WCD 102 has transitioned to CELL_DCH (see FIG. 8, step 802). If not, then AN 104 performs step 604, otherwise AN 104 transmits a HARQ ACK (step 804). In the example shown in FIG. 8, after step 604, process 800 goes back to step 602.

Figure 9:
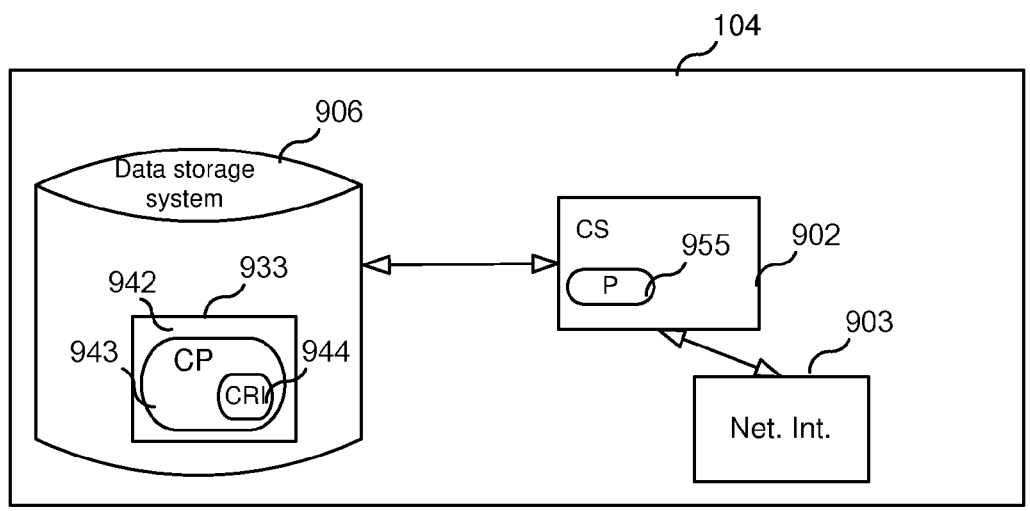
FIG. 9 is a block diagram of a Radio Access Node, according to some embodiments.

FIG. 9 is a block diagram of an embodiment of AN node 104. As shown in FIG. 9, AN node 104 may include: a computer system (CS) 902, which may include one or more processors 955 (e.g., a general purpose microprocessor) and/or one or more circuits, such as an application specific integrated circuit (ASIC), field-programmable gate arrays (FPGAs), and the like; a network interface 903 for use in connecting AN node 104 to a network (e.g., network 110); and a data storage system 906, which may include one or more non-volatile storage devices and/or one or more volatile storage devices (e.g., random access memory (RAM)). In embodiments where AN node 104 includes a processor 955, a computer program product (CPP) 933 may be provided. CPP 933 includes a computer readable medium (CRM) 942 storing a computer program (CP) 943 comprising computer readable instructions (CRI) 944. CRM 942 may be a non-transitory computer readable medium, such as, but not limited to magnetic media (e.g., a hard disk), optical media (e.g., a DVD), memory devices (e.g., random access memory), and the like. In some embodiments, the CRI 944 of computer program 943 is configured such that when executed by data processing system 902, the CRI causes the AN node 104 to perform steps described above (e.g., steps described above with reference to the flow charts shown in FIGS. 2, 4, 5, 6 and 8). In other embodiments, AN node 104 may be configured to perform steps described herein without the need for code. That is, for example, data processing system 902 may consist merely of one or more ASICs. Hence, the features of the embodiments described herein may be implemented in hardware and/or software.

While various embodiments have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

ABBREVIATIONS

E-DCH=Enhanced Uplink Dedicated Channel
CELL_FACH=Forward Access Channel cell state
CELL_DCH=Dedicated Channel cell state
WCD=Wireless Communication Device
HS-DPCCH=Dedicated Physical Control Channel (uplink) for HS-DSCH
HS-DSCH=High Speed Dedicated Shared Channel
RLC=Radio Link Control
RLC AM=RLC Acknowledge Mode
RNC=Radio Network Controller
MRW=Moving Receiving Window
SUFI=Super Field
ACK=Acknowledgement
MAC PDU=Media Access Control Process Data Unit
HARQ NACK=Hybrid Automatic Repeat Request Negative Acknowledgement
RB=Radio Bearer
SGSN=Serving GPRS Support Node
GGSN=Gateway GPRS Support Node

The invention claimed is:

1. A method for facilitating the transition of a wireless communication device (WCD) from a CELL_FACH state to a CELL_DCH state, the method comprising:
   determining that the WCD should transition from the CELL_FACH to the CELL_DCH cell state; and
   in response to determining that the WCD should transition from the CELL_FACH to the CELL_DCH cell state:
   i) sending to the WCD a first configuration message for moving the WCD from the CELL_FACH state to the CELL_DCH state,
   ii) sending to the WCD a second configuration message for forcing the WCD to obtain a common E-DCH resource or retain a previously obtained common E-DCH resource, wherein the second configuration message is a message for requesting the WCD to move a reception window, comprises a Move Receiving Window (MRW) super-field (SUFI) and/or contains outdated information about the reception window; and
   iii) when the second configuration message contains outdated information, triggering a transmission of an acknowledgement (ACK), acknowledging a reception of the second configuration message and affecting the WCD to acquire a common E-DCH resource.

2. The method of claim 1, further comprising the steps of:
   determining that the WCD has not yet transitioned to the CELL_DCH state and has transmitted an acknowledgement in response to the second configuration message; and
   sending to the WCD a third configuration message for forcing the WCD to retain a previously obtained common E-DCH resource in response to determining that the WCD has not yet transitioned to the CELL_DCH state and has transmitted the acknowledgement.

3. The method of claim 1, further comprising the steps of:
   determining that the WCD has not yet transitioned to the CELL_DCH state; and
   sending to the WCD a third configuration message for forcing the WCD to retain a previously obtained common E-DCH resource in response to determining that the WCD has not yet transitioned to the CELL_DCH state.

4. The method of claim 1, wherein the third configuration message is the same as the second configuration message.

5. The method of claim 1, wherein the first configuration message is one of: a Cell Update Confirm message, a Radio Bearer (RB) Reconfiguration message, and an RB Setup message.

6. The method of claim 1, further comprising:
   receiving a Media Access Control (MAC) protocol data unit (PDU) transmitted by the WCD in response to the second configuration message; and
   in response to receiving the MAC PDU transmitted by the WCD, transmitting to the WCD a hybrid repeat request (HARQ) negative acknowledgement (NACK), regardless of whether the MAC PDU was successfully decoded.

7. An access node for facilitating the transition of a wireless communication device (WCD) from a CELL_FACH state to a CELL_DCH state, the access node being adapted to:
   determine that the WCD should transition from the CELL_FACH to the CELL_DCH cell state; and
   in response to determining that the WCD should transition from the CELL_FACH to the CELL_DCH cell state:

i) send to the WCD a first configuration message for moving the WCD from the CELL_FACH state to the CELL_DCH state, and ii) send to the WCD a second configuration message for forcing the WCD to obtain a common E-DCH resource or retain a previously obtained common E-DCH resource, wherein the second configuration message is a message for requesting the WCD to move a reception window, comprises a Move Receiving Window (MRW) super-field (SUFI) and/or contains outdated information about the reception window; and iii) when the second configuration message contains outdated information, trigger a transmission of an acknowledgement (ACK), acknowledging a reception of the second configuration message and affect the WCD to acquire a common E-DCH resource.

8. The access node of claim 7, wherein the access node is further adapted to:

determine that the WCD has not yet transitioned to the CELL_DCH state and has transmitted an acknowledgement in response to the second configuration message; and send to the WCD a third configuration message for forcing the WCD to retain a previously obtained common E-DCH resource in response to determining that the WCD has not yet transitioned to the CELL_DCH state and has transmitted the acknowledgement.

9. The access node of claim 7, wherein the access node is further adapted to:

determine that the WCD has not yet transitioned to the CELL_DCH state; and send to the WCD a third configuration message for forcing the WCD to retain a previously obtained common E-DCH resource in response to determining that the WCD has not yet transitioned to the CELL_DCH state.

10. The access node of claim 7, wherein the second configuration message is a message for requesting the WCD to move a reception window and the third configuration message is the same as the second configuration message.

11. The access node of claim 7, wherein the first configuration message is one of: a Cell Update Confirm message, a Radio Bearer (RB) Reconfiguration message, and an RB Setup message.

12. The access node of claim 7, wherein the access node is further adapted to:

receive a Media Access Control (MAC) protocol data unit (PDU) transmitted by the WCD in response to the second configuration message; and in response to receiving the MAC PDU transmitted by the WCD, transmit to the WCD a hybrid repeat request (HARQ) negative acknowledgement (NACK), regardless of whether the MAC PDU was successfully decoded.

13. A method for facilitating the transition of a wireless communication device (WCD) from a CELL_FACH state to a CELL_DCH state, the method comprising:

determining that the WCD should transition from the CELL_FACH to the CELL_DCH cell state;

in response to determining that the WCD should transition from the CELL_FACH to the CELL_DCH cell state, (i) sending to the WCD a configuration message for moving the WCD from the CELL_FACH state to the CELL_DCH state, (ii) sending to the WCD a second configuration message for forcing the WCD to obtain a common E-DCH resource or retain a previously obtained common E-DCH resource, wherein the second configuration message is a message for requesting the WCD to move a reception window, comprises a Move Receiving Window (MRW) super-field (SUFI) and/or contains outdated information about the reception window; and (iii) when the second configuration message contains outdated information, triggering a transmission of an acknowledgement (ACK), acknowledging a reception of the second configuration message and affecting the WCD to acquire a common E-DCH resource;

after sending the configuration message, receiving a status message transmitted by the WCD; and after receiving the status message, causing the WCD to resend the status message.

14. The method of claim 13, wherein the configuration message is one of: a Cell Update Confirm message, a Radio Bearer (RB) Reconfiguration message, and an RB Setup message.

15. The method of claim 13, wherein the status message is a media access control (MAC) protocol data unit (PDU) comprising Scheduling Information, SI, with a Total E-DCH Buffer Status, TEBS, set to zero.

16. The method of claim 13, wherein causing the WCD to resend the status message comprises sending to the WCD a response message for causing the WCD to resend the status message.

17. The method of claim 16, wherein the response message for causing the WCD to resend the status message is a MAC hybrid automatic repeat request (HARQ) negative acknowledgement (NACK).

18. The method of claim 13, wherein causing the WCD to resend the status message comprises not sending any acknowledgement message responding to the status message, thereby causing the WCD to resend the status message.

19. The method of claim 13, further comprising the steps of:

receiving a second status message transmitted by the WCD;

determining whether the WCD has transitioned to the CELL_DCH state; and in response to determining that the WCD has not transitioned to the CELL_DCH state, sending, as a response to the second status message, a second response message for causing the WCD to resend the second status message.

20. An access node for facilitating the transition of a wireless communication device (WCD) from a CELL_FACH state to a CELL_DCH state, the access node being adapted to:

determine that the WCD should transition from the CELL_FACH to the CELL_DCH cell state;

in response to determining that the WCD should transition from the CELL_FACH to the CELL_DCH cell state, @ send to the WCD a configuration message for moving the WCD from the CELL_FACH state to the CELL_DCH state, (ii) send to the WCD a second configuration message for forcing the WCD to obtain a common E-DCH resource or retain a previously obtained common E-DCH resource, wherein the second configuration message is a message for requesting the WCD to move a reception window, comprises a Move Receiving Window (MRW) super-field (SUFI) and/or contains outdated information about the reception window; and (iii) when the second configuration message contains outdated information, trigger a transmission of an acknowledgement (ACK), acknowledging a reception of the second configuration message and affect the WCD to acquire a common E-DCH resource;

after sending the configuration message, receive a status message transmitted by the WCD; and after receiving the status message, cause the WCD to resend the status message.

21. The access node of claim 20, wherein the configuration message is one of: a Cell Update Confirm message, a Radio Bearer (RB) Reconfiguration message, and an RB Setup message.

22. The access node of claim 20, wherein the status message is a media access control (MAC) protocol data unit (PDU) comprising Scheduling Information, SI, with a Total E-DCH Buffer Status, TEBS, set to zero.

23. The access node of claim 20, wherein causing the WCD to resend the status message comprises sending to the WCD a response message for causing the WCD to resend the status message.

24. The access node of claim 23, wherein the response message for causing the WCD to resend the status message is a MAC hybrid automatic repeat request (HARQ) negative acknowledgement (NACK).

25. The access node of claim 20, wherein causing the WCD to resend the status message comprises not sending any acknowledgement message responding to the status message, thereby causing the WCD to resend the status message.

26. The access node of claim 20, wherein the access node is further adapted to:
    receive a second status message transmitted by the WCD;
    determine whether the WCD has transitioned to the CELL_DCH state; and
    in response to determining that the WCD has not transitioned to the CELL_DCH state, send, as a response to the second status message, a second response message for causing the WCD to resend the second status message.

* * * * *